US011865501B2

(12) United States Patent
De Pinho Alho et al.

(10) Patent No.: US 11,865,501 B2
(45) Date of Patent: Jan. 9, 2024

(54) SYSTEM AND METHOD FOR MOVEMENT OF FLUID IN A TANK

(71) Applicant: PETROBRÁS TRANSPORTES S/A.—TRANSPETRO, Rio de Janeiro (BR)

(72) Inventors: Alexandre Teixeira De Pinho Alho, Rio de Janeiro (BR); Marta Cecilia Tapia Reyes, Rio de Janeiro (BR); Peter Kaleff, Niteroi (BR); Luiz Felipe Fontes Lopes Alves, Rio de Janeiro (BR); Jorge Alam Warrak, Nova Iguaçu (BR); Isaias Quaresma Masetti, Rio de Janeiro (BR)

(73) Assignee: PETROBRÁS TRANSPORTES S/A.—TRANSPETRO, Rio de Janeiro (BR)

( * ) Notice: Subject to any disclaimer, the term of this patent is extended or adjusted under 35 U.S.C. 154(b) by 617 days.

(21) Appl. No.: 16/647,320

(22) PCT Filed: Sep. 14, 2018

(86) PCT No.: PCT/GB2018/052636
§ 371 (c)(1),
(2) Date: Mar. 13, 2020

(87) PCT Pub. No.: WO2019/053461
PCT Pub. Date: Mar. 21, 2019

(65) Prior Publication Data

US 2020/0246765 A1 Aug. 6, 2020

(30) Foreign Application Priority Data

Sep. 14, 2017 (BR) ...................... 10 2017 019628-3

(51) Int. Cl.
*B01F 25/00* (2022.01)
*B01F 25/51* (2022.01)
(Continued)

(52) U.S. Cl.
CPC ............ *B01F 25/51* (2022.01); *B01F 23/452* (2022.01); *B01F 2101/49* (2022.01); *B01F 2215/045* (2013.01)

(58) Field of Classification Search
CPC .. B01F 25/51; B01F 2215/045; B01F 23/452; B01F 2101/49
See application file for complete search history.

(56) References Cited

U.S. PATENT DOCUMENTS 4,448,539 A * 5/1984 Burgert ................ B01J 19/2435 366/132
2007/0258318 A1 11/2007 Lamon

FOREIGN PATENT DOCUMENTS

CN 579418 A5 9/1976
GB 836294 A 6/1960
JP 2006314896 A 11/2006

OTHER PUBLICATIONS

Machine Translation of JP 2006314896 (Year: 2006).*
International Search Report and Written Opinion corresponding to PCT/GB2018/052636 dated Dec. 13, 2018.

* cited by examiner

*Primary Examiner* — Anshu Bhatia
(74) *Attorney, Agent, or Firm* — ARENTFOX SCHIFF LLP

(57) ABSTRACT

A system for movement of fluid in a tank comprises: a tank; at least two pumping sets, each pumping set comprising: a pumping line external to the tank and in fluidic communication with the interior of the tank at two separate points of the tank via the two ends of said pumping line, and a pump
(Continued)

configured to circulate fluid through the pumping line, wherein each pumping set is configured to collect fluid from the tank at one end of its respective pumping line, circulate the fluid through its respective pumping line and discharge the fluid into said tank through the other end of its respective pumping line, and wherein each pumping set is configured such that the flow of fluid in its respective pumping line is reversible.

16 Claims, 6 Drawing Sheets

(51) Int. Cl.
*B01F 23/45* (2022.01)
*B01F 101/49* (2022.01)

SYSTEM AND METHOD FOR MOVEMENT OF FLUID IN A TANK

CROSS-REFERENCE TO RELATED APPLICATION

This application is a U.S. National Stage entry under 35 U.S.C. § 371 based on International Application PCT/GB2018/052636, filed on Sep. 14, 2018, which claims the benefit of priority to BR 10 2017 019628-3, filed 14 Sep. 2017. The embodiment of the priority application are hereby incorporated herein in their entirety by reference.

FIELD OF THE INVENTION

The present invention relates to techniques for movement of liquids in tanks such as storage tanks. More specifically, the present invention relates to techniques that can be used for movement of hydrocarbons in storage tanks to prevent the formation of deposits.

BACKGROUND OF THE INVENTION

Hydrocarbons produced at oil exploration sites are stored in tanks during various steps in their processing. During the steps of storage, there may be formation of oily sediments, mainly in some regions of the bottom of the tank.

The deposits consist of colonies of microorganisms and corrosion products of the tanks, which is nothing more than contamination of the hydrocarbon. This contamination, besides the gradual reduction in the useful volume of the tank, results in longer times and higher costs associated with the process of tank emptying, cleaning and maintenance.

Therefore, keeping the deposit-forming elements in suspension is an effective strategy for reducing the formation of deposits in hydrocarbon storage tanks. In this scenario, one of the strategies most used in the oil industry for reducing deposit formation is circulation of the hydrocarbon at velocities above the critical velocity. The methods usually employed are based on mixers of the propeller type (side propeller mixers), installed in specified positions on the side.

Considering a typical arrangement, the dynamics of the flow inside the tank resulting from the action of mixers of the propeller type is characterized by the formation of regions with concentration of kinetic energy, located close to the discharges of the impellers, and regions of recirculation in which predominantly low velocities are observed. These characteristics compromise the efficiency of the system for movement with respect to reduction of the formation of deposits, particularly in the central region of the tank.

Associated with this, these mixers, by introducing moving parts inside the tanks, end up presenting drawbacks in the operation thereof, since they impair their operational continuity during correction/prevention of infiltration and leaks associated with the impellers.

In an attempt to solve the aforementioned problems, some companies have developed tank mixing systems of the "jet mixer" type. Generally such systems provide a point for collecting fluid and an injector nozzle inside the tank for circulating the fluid.

The company Xylem has developed a system known as Flygt Jet Mixer™, which consists of an external jet mixing system comprising a pump that collects the liquid from inside the tank at a specified point and reinjects it at another place. An injection system comprising a nozzle and an ejector is provided inside the tank to increase the efficiency of mixing.

The company Mixrite has also developed a similar system of the "jet mixer" type, where a pump collects the liquid from inside the tank at a specified point and reinjects it at another place. An injection system comprising a nozzle and a diffuser. As fluid is injected under pressure into the tank, passing through the nozzle, vacuum is created at the entrance of the diffuser due to the Bernoulli principle. This effect creates a system for moving the fluid inside the tank.

Although the systems described above do not comprise moving parts inside the tanks, solving one of the main problems of the prior art, they do not achieve such high efficiency of mixing inside the tank, there will always be a region of the tank with high velocity, near the injector nozzle, and other regions with lower velocities. Moreover, in order to achieve efficient mixing in the regions with lower velocities it is necessary to increase the power of the pump considerably, so that there is high energy consumption. Furthermore, depending on the size and shape of the storage tank, such systems may have low efficiency of movement of the fluid.

Finally, the design of the injector nozzles, which makes them more efficient in the process of mixing the liquid in the tank, makes them more susceptible to obstruction, eventually requiring emptying of the tank for nozzle maintenance or replacement. As will be described in more detail below, the present invention aims to at least partially solve the problems of the prior art described above in a practical and efficient manner and at low cost.

SUMMARY OF THE INVENTION

The present disclosure provides an external system for movement of fluids in tanks such as storage tanks that does not require any failure-prone components to be positioned inside the tank, any maintenance being performed on components outside the tank.

The present disclosure also provides an external system for movement of fluids in storage tanks that possesses high efficiency of movement and low energy consumption, independently of the size and shape of the storage tank.

According to the invention there is provided a system for movement of fluid in a tank, the system comprising one or more of: a tank; at least two pumping sets, each pumping set comprising: a pumping line external to the tank and in fluidic communication with the interior of the tank at two separate points of the tank via the two ends of said pumping line, and a pump configured to circulate fluid through the pumping line, wherein each pumping set is configured to collect fluid from the tank at one end of its respective pumping line, circulate the fluid through its respective pumping line and discharge the fluid into said tank through the other end of its respective pumping line, and wherein each pumping set is configured such that the flow of fluid in its respective pumping line is reversible.

According to this arrangement, fluid can be extracted and injected to the tank in different patterns by controlling the directions of flow in the different pumping lines. Changing the mixing patterns avoids quiescent spots forming due to a fixed mixing pattern and thus provides improved protection against build-up of deposits.

Optionally, at least one end of each pumping line extends towards the interior of the tank. Optionally, at least one end of each pumping line comprises the shape of a hydrodynamic nozzle.

Optionally, the system comprises four pumping sets. The pumping sets can be positioned around the tank in pairs, each pair being positioned opposite to the other pair. The pumping sets of a particular pair can be configured to have their flows of fluid inside their pumping lines in the same direction around the tank. Alternatively, the pumping sets of a particular pair can be configured to have their flows of fluid inside their pumping lines in opposite directions around the tank. The pumping sets of each pair can be configured to have their direction of fluid flows around the tank mirror the direction of fluid flows of the opposite pair. Alternatively, the pumping sets of each pair can be configured to have their direction of fluid flows around the tank be inverted compared to the direction of fluid flows of the opposite pair. As such, this arrangement of pumping sets provides many options for varying the flow pattern within the tank.

Optionally, the ends of the pumping lines extend towards the interior of the tank parallel to one another. This can be advantageous in a cylindrical tank, where another option is to have all the pumping lines extend into the tank radially.

Optionally, the system comprises three pumping sets.

Optionally, at least one of the ends of the pumping line comprises two or more outlets/inlets. Given the reversible nature of flow in the pumping line each outlet also functions as an inlet and vice versa.

Optionally, each pumping set further comprises at least one blocking valve positioned in the pumping line on each side of the pump. That is, one valve is upstream (for a given pumping direction) and one valve is downstream of the pump. The valves can be provided at the ends of the pumping lines, for example. Each pumping set can comprise a blocking valve positioned in each inlet/outlet of the ends of the pumping line.

Optionally, the tank is a storage tank.

According to another aspect of the invention, there is provided a method of moving fluid in a tank, using at least two pumping sets external to the tank, the method comprising: with each pumping set, collecting fluid from the tank through a pumping line and discharging the fluid back into the tank through the other end of the pumping line; and for at least one pumping set, reversing the direction of flow through the pumping line. Reversing the direction of fluid flow changes the mixing pattern within the tank. The method can further comprise further steps of reversing the direction of flow through the pumping line of at least on pumping set, and/or changing the fluid flow speed through at least one pumping set as part of a mixing routine.

Optionally, the flow of fluid in each of the pumping lines is from 0.5 to 5 m/s. Optionally, the flow of fluid in each of the pumping lines is from 1 to 3 m/s.

In some methods the flow velocity of fluid in each of the pumping lines is substantially the same. In other methods the flow velocity of fluid is not substantially the same in all the pumping lines. In still further methods, as the mixing pattern is changed, the flow velocities might be substantially the same in the pumping lines at some times, and different at others.

Also disclosed is an external system for movement of fluids in a storage tank, comprising at least two pumping sets, each pumping set comprising (i) a pumping line external to the storage tank in fluidic communication with the interior of the storage tank at at least two separate points of the storage tank via the two ends of said pumping line and (ii) a pump suitable for circulating fluid through the pumping line, wherein the fluid circulated through the pumping line is collected from the storage tank at one end of the pumping line and discharged into said storage tank through the other end of the pumping line, and wherein the flow of fluid in the pumping line is reversible.

There is also disclosed an external system for movement of fluids in a storage tank (10), characterized in that it comprises at least two pumping sets (20, 20*a*, 20*b*, 20*c*, 20*d*), each pumping set (20, 20*a*, 20*b*, 20*c*, 20*d*) comprising: a pumping line (30) external to the storage tank (10) in fluidic communication with the interior of the storage tank (10) at at least two separate points of the storage tank via the two ends of said pumping line (32, 34), and a pump (40) suitable for circulating fluid through the pumping line (30), wherein the fluid circulated through the pumping line (30) is collected from the storage tank (10) at one end of the pumping line (32, 34) and discharged into said storage tank (10) through the other end of the pumping line (32, 34), and wherein the flow of fluid in the pumping line (30) is reversible.

Optionally, at least one end (32, 34) of the pumping line (30) extends towards the interior of the storage tank (10).

Optionally, at least one end (32, 34) of the pumping line (30) comprises the shape of a hydrodynamic nozzle.

Optionally, the system comprises four pumping sets (20*a*, 20*b*, 20*c*, 20*d*).

Optionally, the pumping sets (20*a*, 20*b*, 20*c*, 20*d*) are positioned in the storage tank (10) in pairs, each pair being positioned opposite to the other pair.

Optionally, the pumping sets (20*a*, 20*b*, 20*c*, 20*d*) of a particular pair have their flows of fluid inside their pumping lines (30) in one and the same direction, either clockwise or anti-clockwise.

Optionally, the pumping sets (20*a*, 20*b*, 20*c*, 20*d*) of a particular pair have their flows of fluid inside their pumping lines (10) in opposite directions.

Optionally, the directions in which the ends (32, 34) of the pumping line (30) extend towards the interior of the storage tank (10) are parallel to one another.

Optionally, the system comprises three pumping sets (20*a*, 20*b*, 20*c*, 20*d*).

Optionally, at least one of the ends (32, 34) of the pumping line (30) comprises two or more outlets/inlets.

Optionally, the system comprises at least one blocking valve (50) positioned at each end (32, 34) of the pumping line (30) of the at least two pumping sets (20).

Optionally, the system comprises a blocking valve (50) positioned in each one of the inlets/outlets of the ends (32, 34) of the pumping line (30) of the at least two pumping sets (20).

Optionally, the flow of fluid in each of the pumping lines (30) is from 0.5 to 5 m/s.

Optionally, the flow of fluid in each of the pumping lines (30) is from 1 to 3 m/s.

BRIEF DESCRIPTION OF THE FIGURES

The detailed description presented hereunder refers to the appended figures and their respective reference numbers.

DETAILED DESCRIPTION OF THE INVENTION

Firstly, it is emphasized that the following description will be based on preferred embodiments of the invention. As will be obvious to a person skilled in the art, however, the invention is not limited to these particular embodiments.

Figure 1:
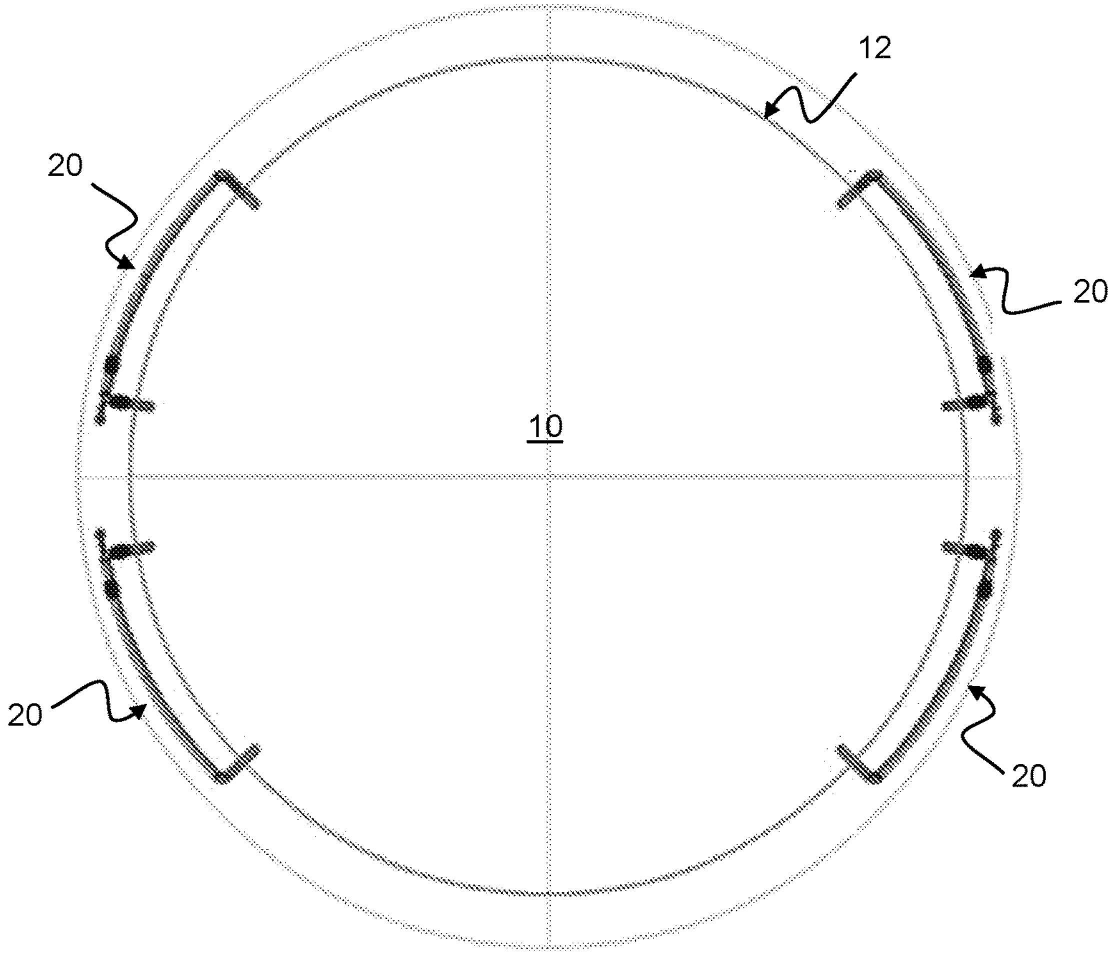
FIG. 1 shows a schematic top view of a storage tank comprising the external system for movement of fluids in an embodiment where four pumping sets are provided.

The present disclosure provides an external system for movement of fluids in a tank such as a storage tank 10. They system comprises at least two pumping sets 20. As an example, FIG. 1 illustrates a schematic top view of a cylindrical storage tank 10, provided with a cylindrical side wall 12. However, although tanks such as storage tanks 10 are commonly cylindrical, the present invention could be utilised with tanks of any shape. In any case, returning to FIG. 1, the tank 10 is provided with an external system for movement of fluids of the present invention in an embodiment where four pumping sets 20 are provided. That is, the system is "external" in the sense that the movement is achieved by removing fluid, pumping it externally around the tank 10 and then re-injecting it into the tank 10 at a different point (this is in contrast, for example, to internal mixer propellers or equivalents which are positioned within the tank). As such, any parts expected to require regular maintenance are external to the tank 10.

Figure 2:
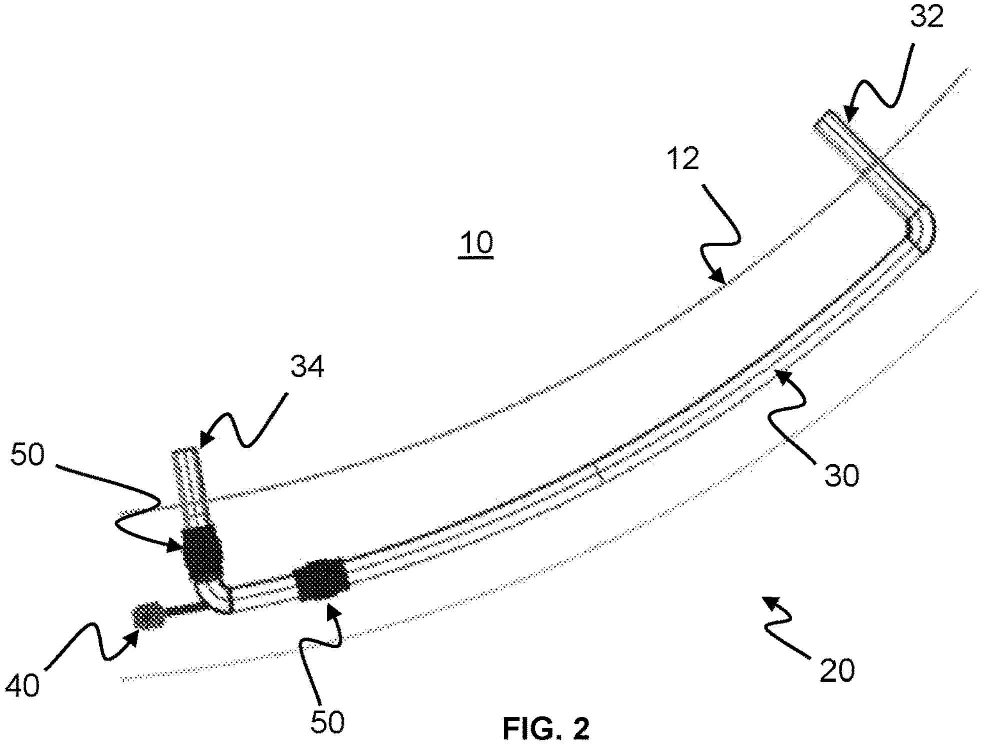
FIG. 2 shows a schematic top view of one of the pumping sets in FIG. 1.
Figure 3:
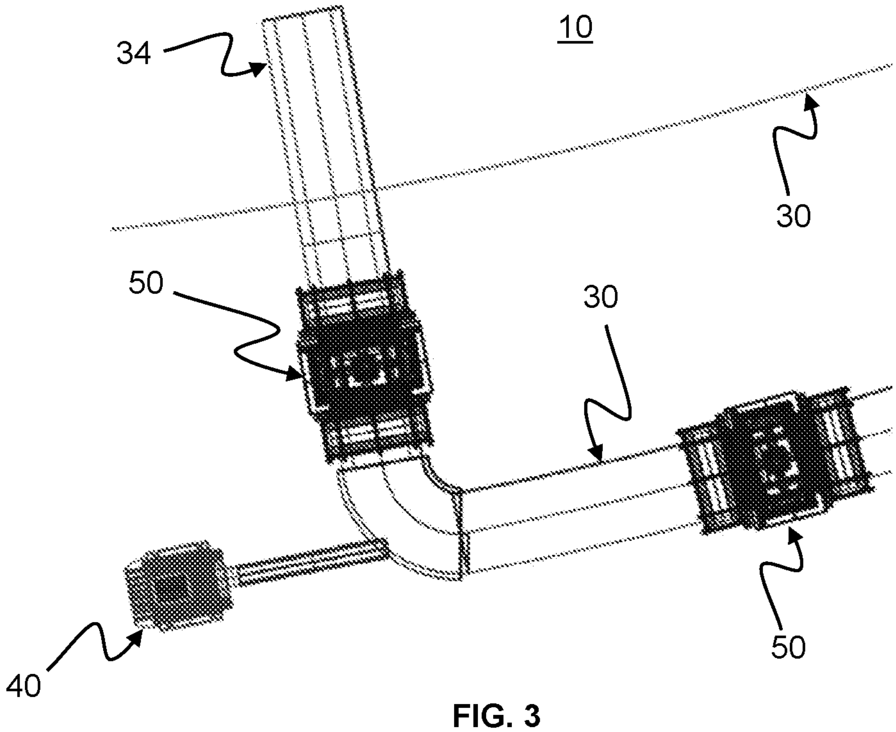
FIG. 3 shows a detailed top view of the left side of the pumping set in FIG. 2.
Figure 5:
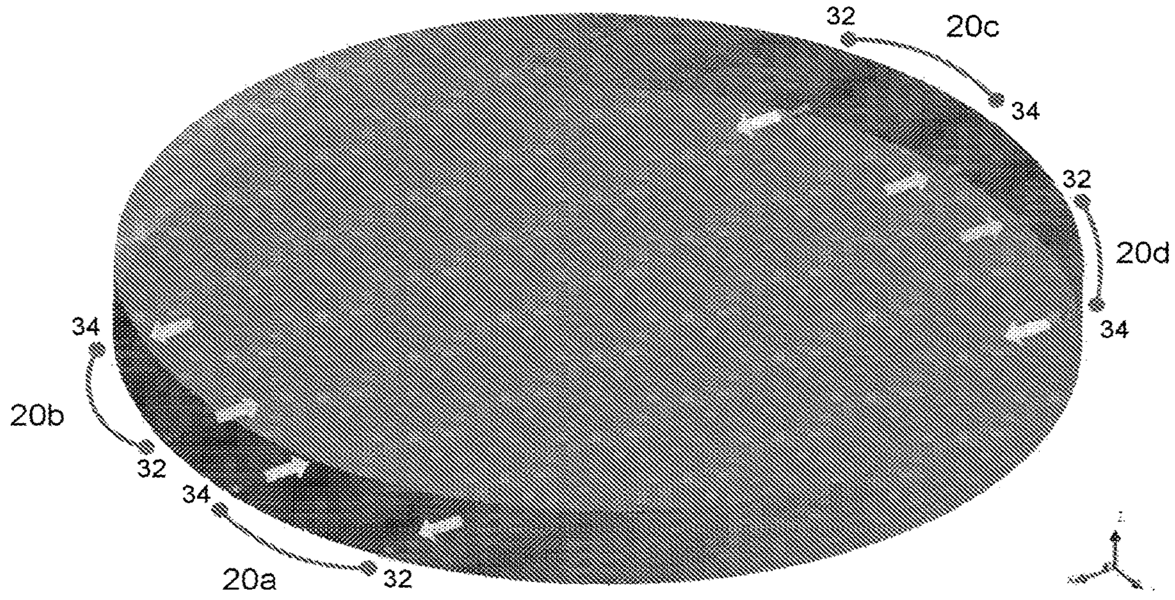
FIG. 5 shows a schematic isometric view of a storage tank comprising the external system for movement of fluids in an embodiment where four pumping sets operate with combined flows.

As illustrated in the details in FIGS. 2 and 3, each pumping set 20 comprises a pumping line 30. The pumping line 30 is external to the storage tank 10. The pumping line 30 is in fluidic communication with the interior of the storage tank 10 at at least two separate points of the storage tank 10 via two ends 32, 34 of said pumping line 30. That is, the ends of ends 32, 34 of each pumping line 30 are spaced apart from each other and connect to the interior of the tank 10. At least one of the ends 32, 34 of the pumping line 30 can extend towards the interior of the storage tank 10. In embodiments where the storage tank is cylindrical, all the ends 32, 34 of the pumping lines 30 can be directed substantially towards the centre of the tank, as illustrated in FIG. 1. In other embodiments where the storage tank is cylindrical, all the ends 32, 34 of the pumping lines 30 can be directed into the tank substantially parallel to each other, as illustrated in FIG. 5 (and discussed in more detail later).

Figure 4:
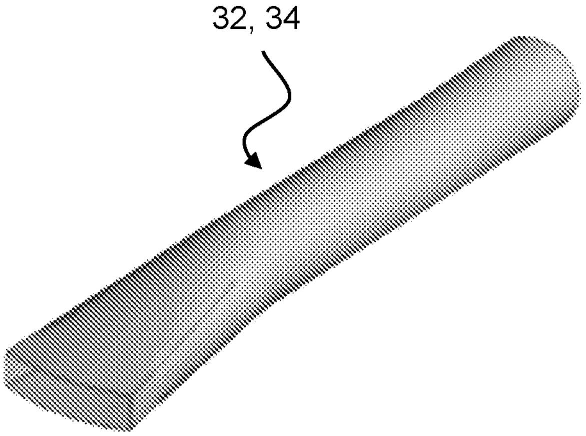
FIG. 4 shows an isometric view of one end of a pumping line comprising a hydrodynamic format.

The ends 32, 34 of the pumping line 30 of each pumping set 20 can be a nozzle. The nozzle can have the shape of a hydrodynamic nozzle, as illustrated in FIG. 4. This specific shape was developed to promote even more effective movement of the flow in the layer of fluid near the bottom of the tank. The shape is that of a cylindrical tube which tapers (in a first direction) and broadens (in a perpendicular direction to the first direction) into a substantially rectangular slot. The inlet/outet of the nozzle (depending on the direction of fluid flow) is slightly convex when viewed from the end—that is the rectangular slots curves backwards such that the narrow ends of the slot are behind the centre. Experimental tests and results of numerical modelling of fluid dynamics (CFD: Computational Fluid Dynamics) showed the considerably higher efficiency of this design of hydrodynamic nozzle for the application in question.

Irrespective of the particular shape, the ends 32, 34 of the pumping line 30 of each pumping set 20 function as both outlets and inlets for the pumping line 30. As explained in more detail below, flow can go in either direction through the pumping line 30, and thus the skilled person will understand that the terms 'outlet' and 'inlet' can be used interchangeably. In view of this, this document refers to 'outlets/inlets' in the following description and claims.

In addition, as illustrated in FIGS. 1 to 3, each pumping set 20 of the system of the present invention comprises a pump 40 suitable for circulating fluid through the pumping line 30. Thus, fluid from inside the storage tank 10 is collected by one of the ends 32, 34, circulated through the pumping line 30 and discharged at the opposite end 32, 34.

Each pump can be provided with a velocity control system. This could be, for example, by means of a frequency inverter. This means that the direction of the flow and the value of the operating flow rate of each pumping set 20 can be adjusted independently of the others. Thus, this means that the flow of fluid in the pumping line 30 of each pumping set 20 is controlled in its intensity. This is also one way of making the flow of fluid in each pumping line 30 reversible.

The system allows a routine of alternation of flow directions and velocities to be established for a particular storage tank 10, meaning that there is maximum elimination of permanent regions with low velocity, as observed in the systems of the prior art. That is, a routine can be set that sets and changes the directions of flows of fluid through the pumping sets 20, thus varying the velocity profiles within the tank 10.

Figure 8:
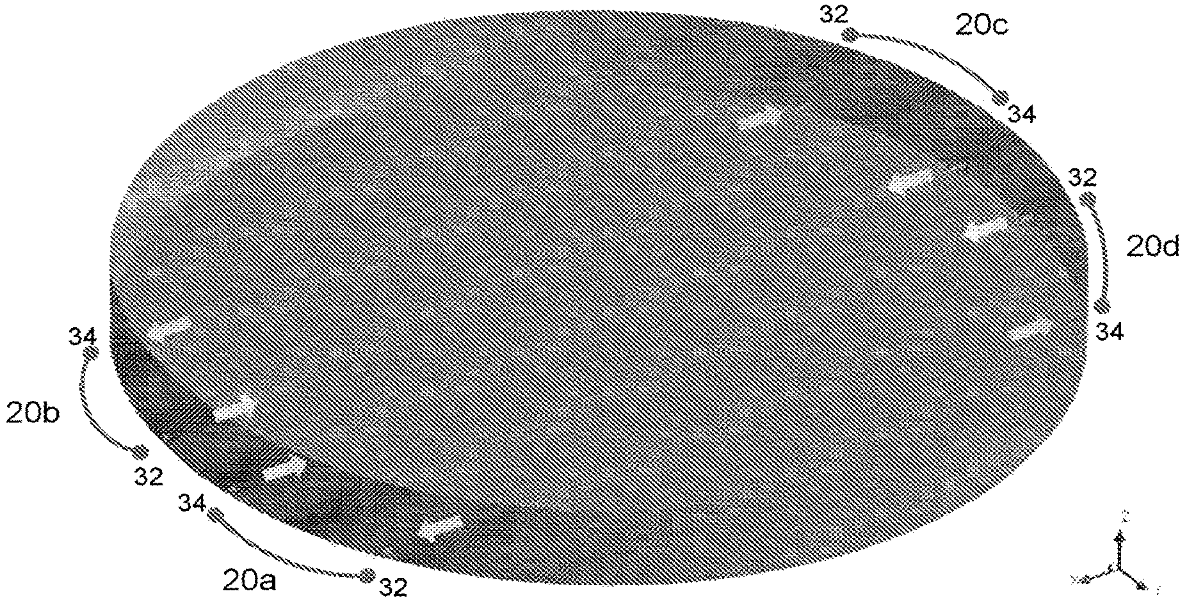
FIG. 8 shows a schematic isometric view of a storage tank comprising the external system for movement of fluids in an embodiment where four pumping sets operate with opposite flows.

FIGS. 5 and 8 illustrate an embodiment of the system of the present invention comprising four pumping sets **20*a*, 20*b*, 20*c*, 20*d*. The four pumping sets 20*a*, 20*b*, 20*c*, 20*d* are positioned in the storage tank 10 in pairs. Each pair is positioned opposite to the other pair. That is, the pumping sets are arranged with two sets 20*a*, 20*b* (forming a first pair), on one side of the tank 10 and two sets 20*c*, 20*d* (forming a second pair) on the opposite side (in this example using a substantially cylindrical tank 10, the sets are radially opposite each other). In other words, the arrangement of one pair of sets 20 mirrors the arrangement of the other across the centre of the tank 10. In the embodiment depicted, the directions in which the ends 32, 34 of all the pumping lines 30 are pointing into the storage tank 10 are parallel to one another. In the embodiment depicted, the ends 32, 34 of all the pumping lines 30** are at substantially the same height in the tank.

Still referring to FIGS. 5 and 8, two combinations of flows are illustrated, among numerous that are possible. For ease of comprehension, since the storage tank 10 used as the example in the figures is cylindrical, we shall use the designations "clockwise flow" when the direction of the flow around the tank in a particular pumping line 30 is clockwise with respect to a view from above the depicted storage tank 10 (i.e. from end 32 to end 34 in FIG. 5) and "anti-clockwise flow" when the direction of the flow around the tank in a particular pumping line 30 is anti-clockwise with respect to a view from above the depicted storage tank 10 (i.e. from end 34 to end 32 in FIG. 5).

Based on the foregoing, FIG. 5 presents an example of configuration of flows called "operation with combined flows". This is so-called because each pair of pumping sets 20 are operated such that flow through the closest pump line ends within each pair is in the same direction, and such that flow through the pump line ends opposite each other (i.e. in opposite pairs) are in the same direction with respect to the tank (and thus the flows of the pumping set pairs are inverted with respect to each other). In this way the pumping sets 20 can be viewed as cooperating to form large combined circulating cells within the tank 10.

In more detail, in this configuration, a first pumping set 20*a* has the flow in its pumping line clockwise. The flow in the pumping line of the second 20*b* pumping set (forming a first pair with set 20*a*) is anti-clockwise. As shown in FIG. 5, this effectively results in fluid being drawn from the two edges of the tank and being injected more centrally. In contrast, third 20*c* and fourth 20*d* pumping sets (forming the second pair) have anti-clockwise and clockwise flows respectively—and are thus inverted compared to the first pair, drawing fluid from the centre of the tank and injecting it at the sides. Thus, in the operation with combined flows of the example above, quicker flows are created in central and lateral lines parallel to the direction in which the ends 32, 34 of the pumping lines 30 are pointing.

Figure 6:
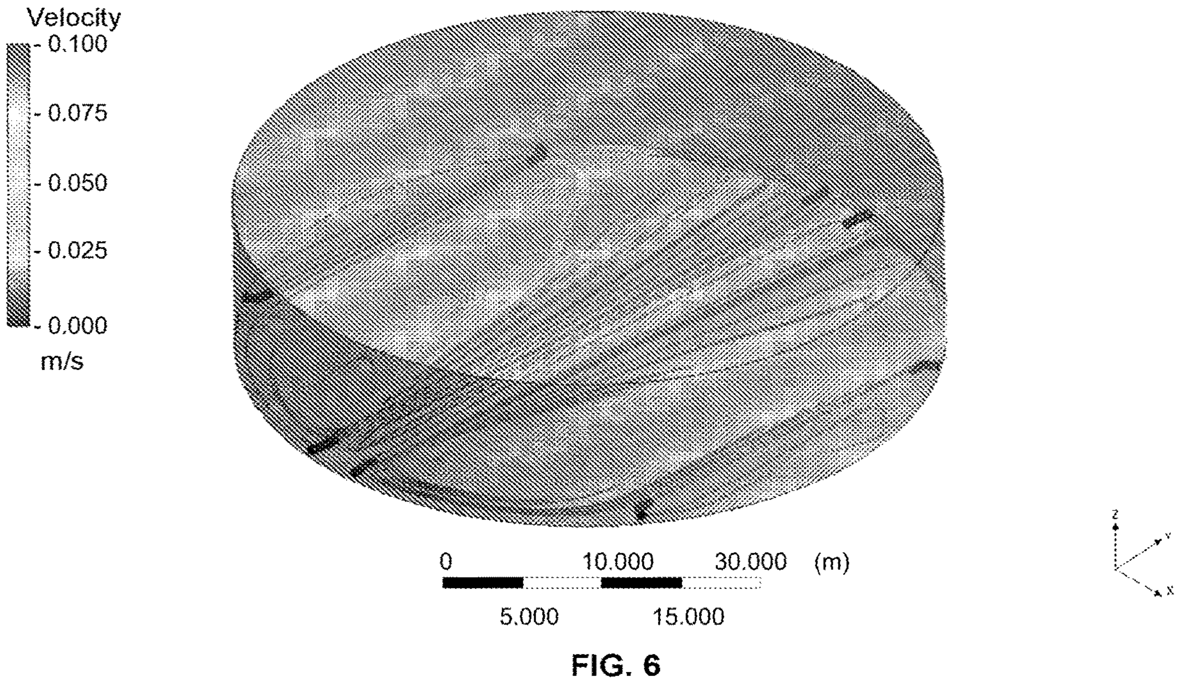
FIG. 6 presents results obtained by CFD numerical simulations for the operation with combined flows in FIG. 5 in a first configuration of flows.
Figure 7:
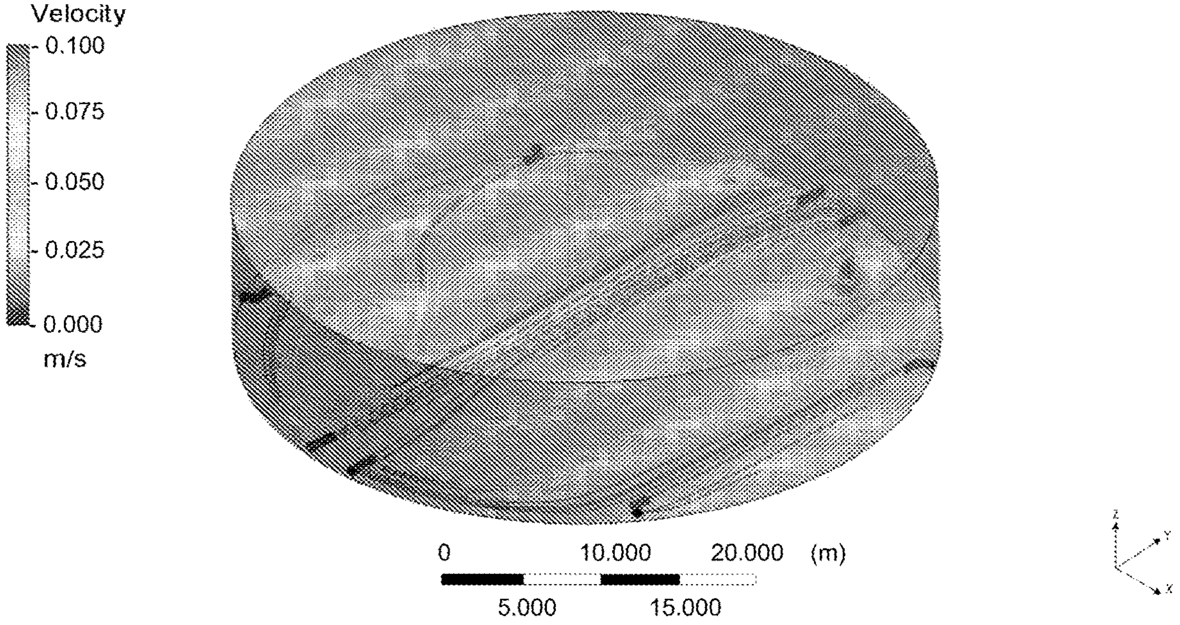
FIG. 7 presents results obtained by CFD numerical simulations for the operation with combined flows in FIG. 5 in a second configuration of flows.

FIGS. 6 and 7 present results obtained by CFD numerical simulations for two configurations of operation with combined flows. The colour gradient legend shows the velocity of the flow lines in metres per second (m/s) at a level 0.7 m above the bottom of the storage tank. More specifically, FIG. 6 illustrates results for a configuration of operation with combined flows where the flow in each pumping line is 2.0 m/s. In its turn, FIG. 7 illustrates results for a configuration of operation with combined flows where the flow in the pumping lines of the first 20*a* and third 20*c* sets is 2.0 m/s and the flow in the pumping lines of the second 20*b* and fourth 20*d* sets is 1.0 m/s.

FIG. 8 presents an example of a configuration of flows called "operation with opposite flows". This is so-called because each pair of pumping sets 20 are operated such that flow through the closest pump line ends within each pair is in the same direction, and such that flow through the pump line ends opposite each other (i.e. in opposite pairs) are in opposite directions with respect to the tank (and thus the flows of the pumping set pairs are mirrored with respect to each other). In this way the pumping sets 20 are can be considered to be working against each other (drawing fluid from opposite positions and injecting fluid at opposite positions).

In more detail, in this configuration, a first pumping set 20*a* has the flow in its pumping line clockwise. The flow in the pumping line of the second 20*b* pumping set (forming a first pair with set 20*a*) is anti-clockwise. As shown in FIG. 8, this effectively results in fluid being drawn from the two edges of the tank and being injected more centrally. Similarly, third 20*c* and fourth 20*d* pumping sets (forming the second pair) have clockwise and anti-clockwise flows respectively—and are thus mirror the flows of the first pair, drawing fluid from the sides of the tank and injecting it more centrally. Thus, in the operation with opposite flows of the above example, generally more turbulent flows are created near the bottom of the storage tank.

Figure 9:
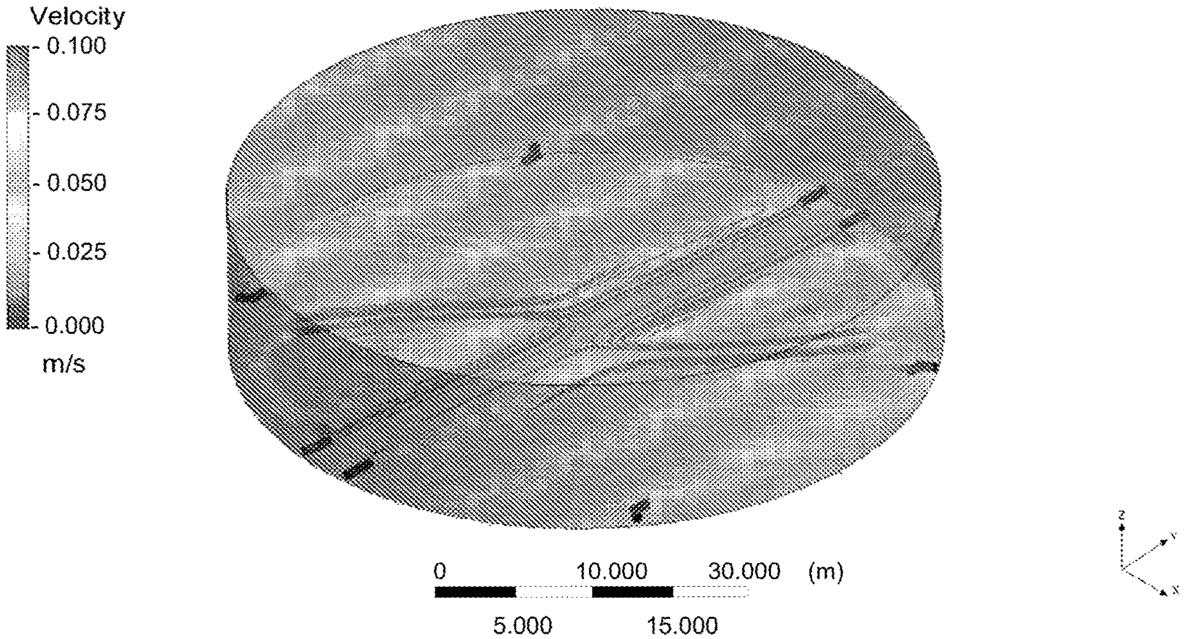
FIG. 9 presents results obtained by CFD numerical simulations for the operation with opposite flows in FIG. 8.

FIG. 9 presents results obtained by CFD numerical simulations, in the same conditions as in FIGS. 6 and 7, for two configurations of operation with opposite flows. In this simulation, the flow in each pumping line is 2.0 m/s.

Thus, as already mentioned above, the system means that a routine of alternation of flow directions and velocities (opposite and combined, for example) can be established in a specified cycle of movement for a specified storage tank. This means that regions of high and low velocity vary their positions inside the tank along with the variations of the cycle. Moreover, these alternations in a specified cycle allow better adjustment of the velocities of the fluid so that they adapt to any shape and size of storage tank.

It should be emphasised that although the "opposite" and "combined" flow patterns have been discussed in detail, other patterns are also possible and could be used in a varying routine of flow patterns. For example, whilst the pumping sets 20 within each pair have opposite flow directions around the tank (i.e. one clockwise, one anti-clockwise) in the "opposite" and "combined" flow patterns, they may have the same flow direction around the tank in other patterns.

Figure 10:
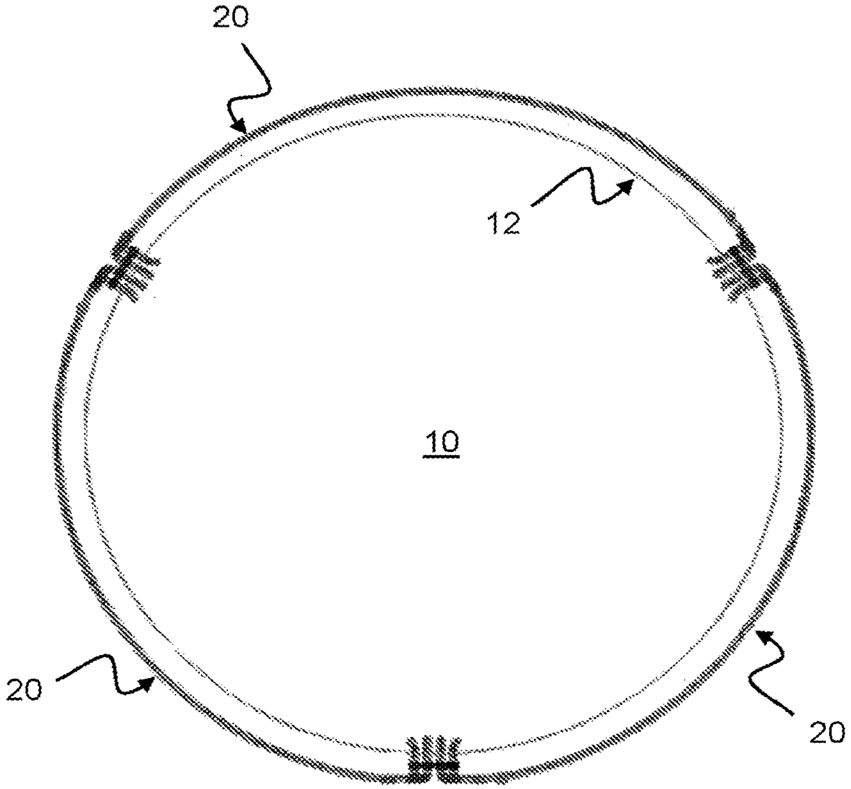
FIG. 10 shows a schematic top view of a storage tank comprising the external system for movement of fluids in an embodiment where three pumping sets are provided.

In some embodiments, illustrated by a top view in FIG. 10, three pumping sets 30 can be employed. Another feature illustrated in this embodiment, so as to increase the angular amplitude of the flow injected into the tank, is that each end of the pumping line comprises two or more separate outlets and inlets (e.g. two hydrodynamic nozzles) pointing in different directions, as illustrated in detail in FIG. 11. It should be emphasized that this configuration of two outlets/inlets at each end of the pumping line 30 may be employed in any possible embodiment, regardless of the number of pumping sets 20.

A blocking valve 50, with automatic or manual drive, can be provided downstream and upstream of the pump 40 (i.e. on each side of the pump), optionally at each end 32, 34 of each pumping line 30. This makes it possible for each pumping set 20 to be isolated or disconnected independently of the others for maintenance of the pump 40 or to reduce the number of pumping sets 20 in operation (for example to reduce the energy consumption for a period of time).

Figure 11:
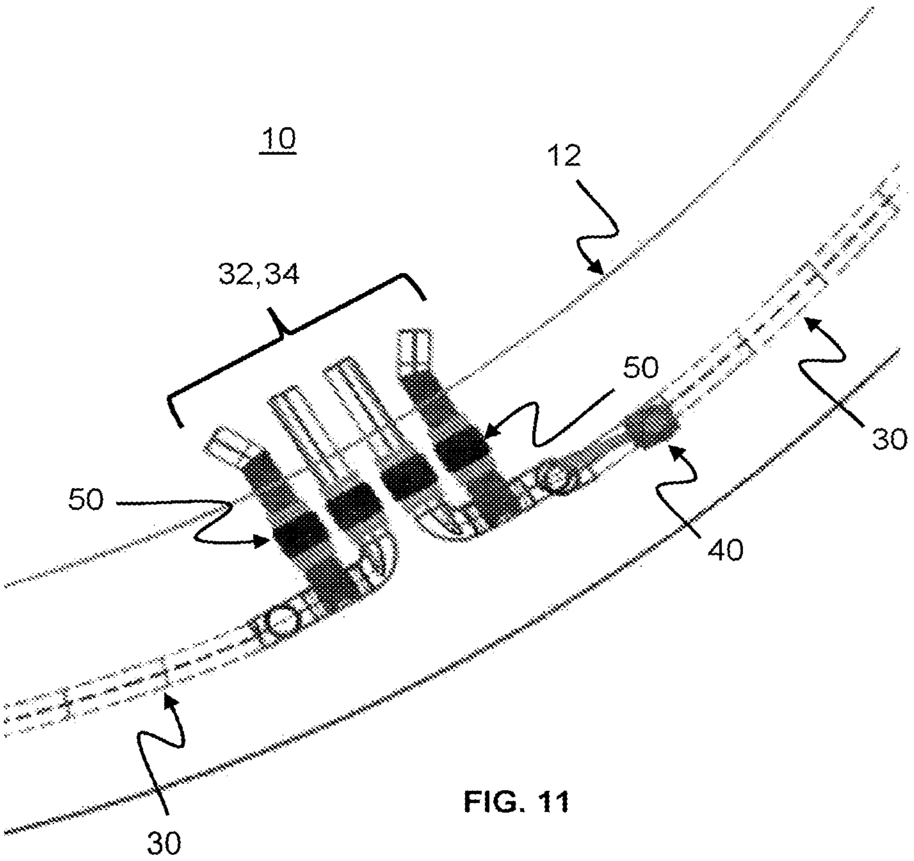
FIG. 11 shows a detailed top view of one of the sides of two of the pumping sets in FIG. 10.
Figure 12:
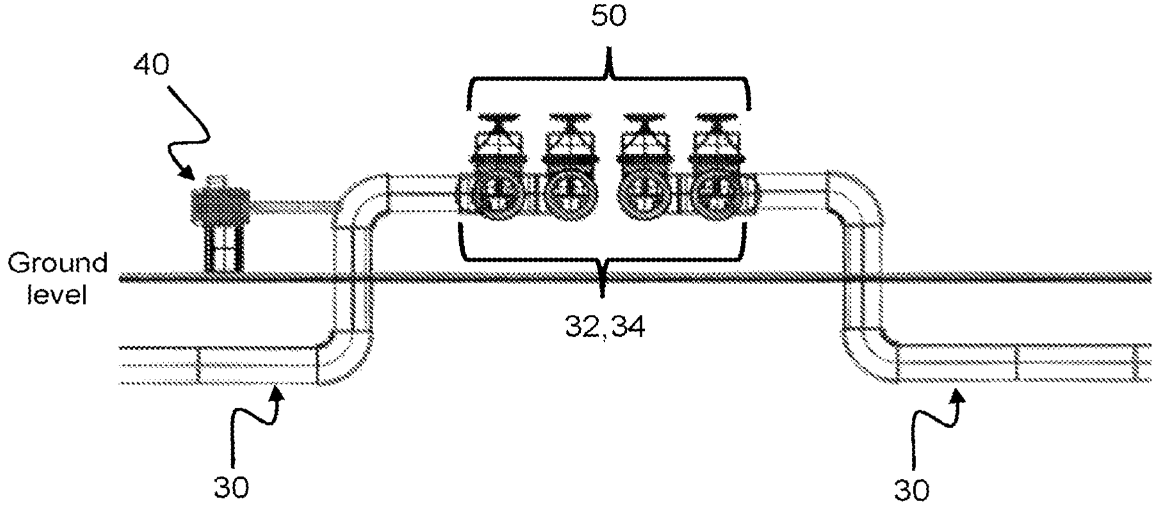
FIG. 12 shows a detailed front view of one of the sides of two of the pumping sets in FIG. 10.

In the embodiment illustrated in FIGS. 10, 11 and 12, two outlets/inlets are provided at each end of the pumping line 30, and each of the two outlets/inlets may comprise a blocking valve 50. Besides allowing closure of the entire pumping set 20, as mentioned above, this arrangement makes it possible for just one outlet/inlet at each end of the pumping line 30 to be closed, meaning that in certain situations the pumping set 30 can operate with just one inlet and one outlet, thus giving greater configurability for the different flow patterns available.

Optionally, as illustrated in FIG. 12, the central portion of the pumping lines 30 (i.e. the portions at the edges of FIG. 12) may be buried, i.e. positioned below ground level. This avoids a concentration of parts and components around the storage tank 10 and possible damage to the pipelines.

Accordingly, based on the above description, the present disclosure provides an external system for movement of fluids in storage tanks. The system does not require any failure-prone components positioned inside the tank, any servicing and maintenance being carried out on components outside the tank. The system still possesses high efficiency of movement and low energy consumption, and can be adapted to the most varied types of design of the storage tank.

In addition, owing to the possibilities of implementation of routines with variation of direction and intensity of flow in each of the pumping sets 20, the system allows very high efficiency of mixing inside the tank, so that the power used is considerably less than in systems of the prior art. As an example, compared to the systems of the jet mixer type cited in the background section of the present description, the difference in operating power is quite significant. Taking as a reference the J200 model from the company Mixrite, which operates in maximum conditions of 722.2 $m^3/h$ at 7.0 bar, a value of operating power of the order of 26 hp is estimated for these conditions (assuming a typical value of efficiency of the pump equivalent to 70%). Assuming the condition of optimum cost/benefit is achieved, the system of the present disclosure has a power consumption of approximately 9 hp, for a flow rate of the order of 2190 $m^3/h$. Thus, in the present comparative example, the system of the present disclosure achieves a flow rate approximately three times greater while the power consumption is practically three times smaller. The significantly higher efficiency of the present system relative to the systems in the prior art is thus confirmed.

Numerous variations falling within the scope of protection of the present application are permitted. This reinforces the fact that the present invention is not limited to the particular configurations/embodiments described above. As such, modifications of the above-described apparatuses and methods, combinations between different variations as practicable, and variations of aspects of the invention that are obvious to those of skill in the art are intended to be within the spirit and scope of the claims.

The invention claimed is:

1. A system for movement of fluid in a tank, the system comprising:
- a tank; and
- at least two pumping sets, each pumping set comprising:
  - an external pumping line disposed along an exterior of the tank such that the external pumping line is in fluidic communication with an interior of the tank at two separate points of the tank via two ends of the external pumping line, and
  - a pump configured to circulate fluid through the external pumping line, wherein each pumping set is configured to collect fluid from the tank at one end of its respective external pumping line, circulate the fluid externally around the tank through its respective external pumping line and discharge the fluid back into the tank through the other end of its respective external pumping line, and
  - wherein each pumping set is configured such that a flow of fluid in its respective external pumping line is reversible.

2. The system of claim 1, wherein at least one end of each pumping line extends towards the interior of the tank.

3. The system of claim 1, wherein at least one end of each pumping line comprises a shape of a hydrodynamic nozzle.

4. The system of claim 1, wherein the system comprises four pumping sets.

5. The system of claim 4, wherein the at least two pumping sets are positioned around the tank in pairs, each pair being positioned opposite to the other pair.

6. The system of claim 5, wherein the pumping sets of a particular pair are configured to have their flows of fluid inside their pumping lines in a same direction around the tank.

7. The system of claim 5, wherein the pumping sets of a particular pair are configured to have their flows of fluid inside their pumping lines in opposite directions around the tank.

8. The system of claim 5, wherein the pumping sets of each pair are configured to have their direction of fluid flows around the tank mirror the direction of fluid flows of the opposite pair.

9. The system of claim 5, wherein the pumping sets of each pair are configured to have their direction of fluid flows around the tank be inverted compared to the direction of fluid flows of the opposite pair.

10. The system of claim 1, wherein the ends of the external pumping lines extend towards the interior of the tank parallel to one another.

11. The system of claim 1, wherein the system comprises three pumping sets.

12. The system of claim 1, wherein at least one of the ends of the external pumping line comprises two or more outlets/inlets.

13. The system of claim 1, wherein each pumping set further comprises at least one blocking valve positioned in the external pumping line on each side of the pump.

14. The system of claim 13, wherein each pumping set comprises a blocking valve positioned in each inlet/outlet of the ends of the external pumping line.

15. The system of claim 1, wherein the tank is a storage tank.

16. A method of moving fluid in a tank, using at least two pumping sets external to the tank, the method comprising:
- with each pumping set having a respective pump configured to circulate fluid externally around the tank through a respective external pumping line and the respective external pumping line disposed along an exterior of the tank such that the respective external pumping line is in fluidic communication with an interior of the tank at two separate points of the tank via two ends of the respective external pumping line, collecting fluid from the tank through the external pumping line and discharging the fluid back into the tank through the other end of the respective external pumping line using the respective pump; and
- for at least one pumping set, reversing a direction of flow through the external pumping line using the respective pump.

* * * * *